United States Patent

Probst et al.

[11] Patent Number: 5,955,544
[45] Date of Patent: Sep. 21, 1999

[54] GRAFT POLYMERS OF UNSATURATED MONOMERS ONTO MODIFIED POLYUREAS, PROCESSES FOR THEIR PREPARATION AND THEIR USE

[75] Inventors: Joachim Probst, Leverkusen; Tillmann Hassel, Köln; Thomas Münzmay, Dormagen, all of Germany

[73] Assignee: Bayer Aktiengesellschaft, Leverkusen, Germany

[21] Appl. No.: 08/877,385

[22] Filed: Jun. 17, 1997

[30] Foreign Application Priority Data

Jun. 21, 1996 [DE] Germany .................. 196 24 818

[51] Int. Cl.⁶ .................................................. C08F 271/00
[52] U.S. Cl. .......................... 525/128; 525/127; 525/66; 526/297; 526/300; 526/302
[58] Field of Search .................. 525/127, 128, 525/66; 526/297, 300, 302

[56] References Cited

U.S. PATENT DOCUMENTS

| | | | |
|---|---|---|---|
| 2,978,432 | 4/1961 | Graulich et al. | |
| 4,256,636 | 3/1981 | Roos et al. | |
| 4,546,153 | 10/1985 | Kamatani et al. | 525/453 |
| 4,619,966 | 10/1986 | Schäfer et al. | 524/589 |
| 4,636,545 | 1/1987 | König et al. | 524/457 |
| 5,075,370 | 12/1991 | Kubitza et al. | 524/591 |
| 5,284,928 | 2/1994 | Münzmay et al. | 528/52 |
| 5,336,711 | 8/1994 | Schneider et al. | 524/507 |
| 5,422,186 | 6/1995 | Biggeleben et al. | 428/423.3 |
| 5,770,264 | 6/1998 | Münzmay et al. | 427/323 |

FOREIGN PATENT DOCUMENTS 898967  6/1962  United Kingdom .

OTHER PUBLICATIONS

Leder–und Häutemarkt, 23, 111–115, (1991).
H. Träubel, Polyurethane Dispersions in Leather Production, Journal of the Society of Leather Technologists and Chemists, vol. 74, 1, pp. 7–9, (1990).
H. Will, et al., Solvent–Free, High–Performance Finishing Systems, J. Amer. Leather Chemists Assoc., vol. 86, pp. 49–69, (1991).
Houben–Wey, E20, 1659–1661, (1989).

*Primary Examiner*—Erma Cameron
*Attorney, Agent, or Firm*—Sprung Kramer Schaefer & Briscoe

[57] ABSTRACT

Graft polymers of unsaturated monomers onto anionically modified polyureas are outstandingly suitable as binders in the coating of any desired substrates, for example leather.

3 Claims, No Drawings

GRAFT POLYMERS OF UNSATURATED MONOMERS ONTO MODIFIED POLYUREAS, PROCESSES FOR THEIR PREPARATION AND THEIR USE

The invention relates to novel graft polymers comprising ethylenically unsaturated monomers, as graft monomers, onto anionically modified polyureas, as graft base. The term "polyureas" in the context of this invention includes polyurethane ureas. The invention additionally relates to a process for preparing these novel graft polymers, and to their use as binders for the coating of any substrates, for example leather.

The anionically modified polyureas employed as graft base, having terminal cyanourea groups and/or N-cyanoaminocarbonylurea groups built into the polymer chain, are known (DE-A 41 33 572, U.S. Pat. No. 5,284, 928).

Coatings obtained from dispersions of this kind are less hydrophilic than coatings comprising comparable polyurethane dispersions, containing sulfonate or carboxylate groups, since the hydrophilicizing N-cyanoaminocarbonylurea anions and/or cyanourea anions acquire an autocrosslinking character after losing the counterion, and lose their hydrophilicity after crosslinking has taken place. Consequently, these coatings prepared using such dispersions are generally at a higher level in terms of the physical wet fastness properties, on leather for example, than the comparable sulfonate- or carboxylate-modified polyurethane dispersions.

It is also known that polyacrylate dispersions, especially in "hard" formulations, exhibit weaknesses in the creasing behaviour; this disadvantage cannot always be cancelled out even by blending with polyurethane dispersions (cf. W. Wenzel, Leder- und Häutemarkt, 23 (1991) p.111). Furthermore, aqueous finishes on leather almost always have to be crosslinked in order to achieve the required physical wet fastness properties (cf. H. Träubel, Journal of the Society of Leather Technologists and Chemists, 1 (1990) p.7; H. Will and K. Fischer, Journal of the American Leather Chemist's Association 86 (1991) p.49).

This crosslinking is necessary for the reasons mentioned above, but is undesirable since it leads to considerable interlayer adhesion problems when finished leather is oversprayed. Furthermore, the use of crosslinking agents always involves working with two-component systems of limited batch pot life, which is likewise disadvantageous.

It has now been found that products outstandingly suited for the finishing of leather, and which even without crosslinking provide extraordinarily good wet rub fastness and crease fastness properties, are obtained when unsaturated monomers are grafted by a free-radical mechanism onto the abovementioned anionically modified polyureas. It has also been found that this positive effect occurs even when the amount of the polyurea employed as graft base, relative to the amount of the vinyl monomers, is remarkably low.

This finding is surprising since it is evident even from the literature cited above that, although it is possible to improve the creasing behaviour of pure polyacrylates by blending with polyurethanes, external crosslinking is nevertheless absolutely necessary in order to attain the required level of fastness.

The invention therefore provides a process for preparing graft polymers of

A. from 5 to 95, preferably from 10 to 90 parts by weight of polymerisable olefinically unsaturated monomers as graft monomers on B. from 95 to 5, preferably from 90 to 10 parts by weight of polyurea, containing per 100 g of B from 10 to 100 milliequivalents of the group

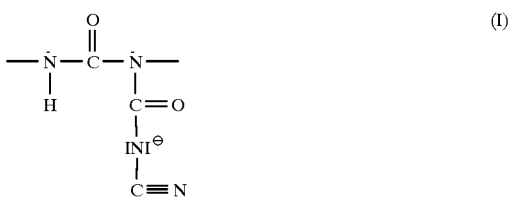

and optionally up to 50 milliequivalents of the group

as graft base, in accordance with which monomer A is polymerized in aqueous emulsion in the presence of the graft base B and of polymerisation initiators which form free radicals.

The invention additionally provides graft polymers obtainable by this process, having a number-average molecular weight of from 1000 to $5 \cdot 10^5$, preferably from 5000 to $2 \cdot 10^5$ g·mol$^{-1}$ (excluding any crosslinked fractions).

The modified polyureas B can be prepared from

I) organic polyisocyanates a) and

II) polyfunctional NCO-reactive compounds from the series
  b) polyhydroxy compounds,
  c) polyamines,
  d) aminoalcohols, and optionally III) monofunctional NCO-reactive compounds e) and optionally IV) water f), for example by way of a prepolymer, in which case an NCO prepolymer having an NCO content of from 0.5 to 10, preferably from 1.5 to 7.5% by weight is first of all prepared from the components a), relatively high molecular mass and optionally relatively low molecular mass components b), c) and/or d), and this prepolymer is reacted with relatively low molecular mass compounds b), c), d) and/or f) water.

According to a preferred embodiment, the unmodified polyureas which are suitable for preparing the novel modified polyureas are prepared by chain-extending an NCO prepolymer using relatively low molecular mass compounds from the series consisting of polyamines and aminoalcohols up to a degree of conversion of the NCO groups of the prepolymer of from 30 to 95%, preferably from 50 to 80%, and subsequent chain extension with water.

In the preparation of the NCO prepolymer, as structural components a) for introducing the oxadiazinetrione and/or uretdione structural units of the formulae

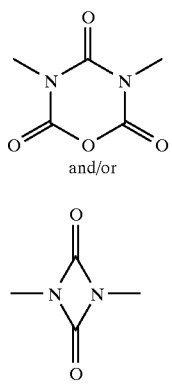

use is made of diisocyanates of the formulae (VI) and/or (VII)

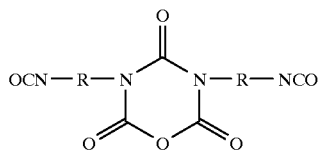

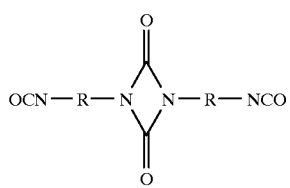

in which

R independently at each occurrence represents the divalent radical of an aliphatic hydrocarbon having 1 to 15 carbon atoms, of a cycloaliphatic hydrocarbon having 3 to 15 carbon atoms, of an araliphatic hydrocarbon having 7 to 15 carbon atoms or of an aromatic hydrocarbon having 6 to 12 carbon atoms, the amount thereof being such that the resulting polyurea possesses, prior to the reaction with the cyanamide salts of the formula

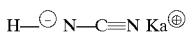

in which

Ka$^+$ represents an alkali metal ion or an optionally substituted ammonium ion, a content from 10 to 180, preferably from 15 to 100 milliequivalents of reactive groups of the formulae (III) and/or (IV), based on 100 g of unmodified polyurea.

The reaction of cyanamide salts (V) with the oxadiazinetrione and/or uretdione structures of the formulae (III) and/or (IV), respectively, can be represented by the following reaction scheme:

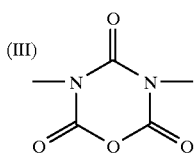

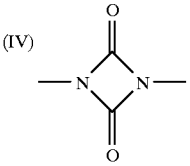

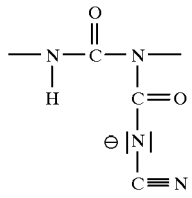

The diisocyanates of the formulae (VI) and (VII) used as structural components under a) are, under the conditions of prepolymer preparation, only reactive towards polyhydroxy components b) in respect of the isocyanate groups; the oxadiazinetrione structures and/or the uretdione structures remain intact. Examples of polyisocyanates of this kind are 1,3-bis-(5-isocyanato-1,3,3-trimethyl-cyclohexyl-methylene)-2,4-dioxo-1,3-diazetidine; 1,3-bis-(3-isocyanato-4-methylphenyl)-2,4-dioxo-1,3-diazetidine; 1,3-bis-(6-isocyanato-hexyl)-2,4-dioxo-1,3-diazetidine; 3,5-bis-(5-isocyanato-1,3,3-trimethylcyclohexyl-methylene)-2,4,6-trioxo-tetrahydro-1,3,5-oxadiazine; 3,5-bis-(4-isocyanatocyclohexyl)-2,4,6-trioxo-tetrahydro-1,3,5-oxadiazine and 3,5-bis-(6-isocyanato-hexyl)-2,4,6-trioxo-tetrahydro-1,3,5-oxadiazine (Desmodur® LB 202, Bayer AG).

Of the isocyanates of the formulae (VI) and (VII) it is preferred to employ those of the oxadiazinetrione series (VI), particularly preferably 3,5-bis-(6-isocyanato-hexyl)-2,4,6-trioxo-tetrahydro-1,3,5-oxadiazine. Some of the polyisocyanates of the formula (VI) and (VII) are technical-grade products. With these products, the isocyanate functionality may be greater than two and the molecular weight may lie above that applicable to pure substances. These technical-grade products can of course be employed in carrying out the novel process. To avoid any unwanted crosslinking it may, if appropriate, be necessary to compensate for this heightened functionality in the course of preparation of the NCO prepolymer, which compensation is done in a manner known per se by the concomitant use of monofunctional NCO-reactive components, such as monools, for example.

Also suitable as structural components a) are any organic compounds which have at least two free isocyanate groups per molecule. Preference is given to the use of diisocyanates $X(NCO)_2$, where X is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms.

Examples of diisocyanates of this kind which are to be employed with preference are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane, 4,4'-diisocyanatodicyclohexyl-methane, 4,4'-diisocyanato-2,2-dicyclohexylpropane, 1,4-diisocyanatobenzene, 2,4-diisocynatotoluene, 2,6-diisocyanatotoluene, 4,4'-diisocyanato-diphenylmethane, 2,2'- and 2,4'-diisocyanatodiphenylmethane, p-xylylene diisocyanate, p-isopropylidene diisocyanate, and also mixtures consisting of these compounds.

It is of course also possible to use, alternatively or in addition, the polyisocyanates of higher functionality which are known per se in polyurethane chemistry, or else modified polyisocyanates which are known per se and have, for example, carbodiimide groups, allophanate groups, isocyanurate groups, urethane groups and/or biuret groups.

"Polyfunctional NCO-reactive compounds" in the context of the invention are those compounds having on average per molecule from 1.8 to 4, preferably from 1.8 to 2.5 NCO-reactive groups, suitable NCO-reactive groups primarily being hydroxyl groups and also primary and secondary amino groups.

The polyhydroxy compounds b) that are employed are preferably compounds of relatively high molecular mass from the classes of the polyester-, polyesterarnide-, polycarbonate-, polyacetal- and polyetherpolyols having mean molecular weights of at least 500, preferably from 500 to 8000, particularly preferably from 800 to 5000.

Particularly suitable polyesterpolyols are linear polyesterdiols or else polyesterpolyols with a minor degree of branching, as can be prepared in a known manner from aliphatic, cycloaliphatic or aromatic polycarboxylic acids and/or their anhydrides, such as, for example, succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid, and also acid anhydrides, such as o-phthalic, trimellitic or succinic anhydride, or a mixture thereof with polyhydric alcohols such as, for example, ethanediol, di-, tri- and tetraethylene glycol, 1,2-propanediol, di-, tri- and tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof, possibly with the concomitant use of polyols of higher functionality, such as trimethylolpropane or glycerol. Also suitable as polyhydric alcohols for preparing the polyesterpolyols are of course cycloaliphatic and/or aromatic polyhydroxy compounds. In place of the free polycarboxylic acids it is also possible to use the corresponding polycarboxylic anhydrides or corresponding polycarboxylic esters with lower alcohols, or mixtures thereof, to prepare the polyester.

The polyesterpolyols can of course also be homo- or copolyaddition compounds of lactones, which are preferably obtained by adding lactones or mixtures of lactones such as butyrolactone, ε-caprolactone and/or methyl-ε-caprolactone onto appropriate difunctional and/or more highly functional starter molecules, for example the relatively low molecular mass polyhydric alcohols specified above as structural components for polyesterpolyols. The corresponding polyaddition compounds of ε-caprolactone are particularly preferred.

Hydroxyl-containing polycarbonates are also suitable as polyhydroxy components b), examples being those which can be prepared by reacting diols, such as 1,4-butanediol and/or 1,6-hexanediol, with diaryl carbonates, for example diphenyl carbonate, or phosgene.

As polyetherpolyols, mention may be made, for example, of the polyaddition products of the styrene oxides, of ethylene oxide, propylene oxide, tetrahydrofuran, butylene oxide and epichlorohydrin, and their mixed addition products, and also the polyetherpolyols obtained by condensation of polyhydric alcohols or mixtures thereof and those obtained by alkoxylation of polyhydric alcohols, amines and aminoalcohols.

It is of course also possible for mixtures of the compounds mentioned above by way of example to be used as structural components b).

Furthermore, relatively low molecular mass polyhydroxy compounds, preferably diols of the molecular weight range from 62 to 499, can optionally also be used as components b). Examples of compounds suitable as such are the polyhydric, especially dihydric, alcohols mentioned under b) for preparing the polyesterpolyols, and also relatively low molecular weight polyesterdiols, for example bis(hydroxyethyl) adipate, or short-chain homo- and copolyaddition products of ethylene oxide or of propylene oxide which are prepared starting from aromatic diols. Examples of aromatic diols which can be used as starters for short-chain homo- and copolyaddition compounds of ethylene oxide or of propylene oxide are 1,4-, 1,3-, 1,2-dihydroxybenzene or 2,2-bis-(4-hydroxyphenyl)-propane (bisphenol A).

These compounds are expediently employed during the actual preparation of the NCO prepolymer.

In order to achieve specific effects, for example to regulate the molecular weight, it is possible if desired to use at the same time monofunctional NCO-reactive compounds e) as structural components. These monofunctional compounds e) are of course employed in amounts not detrimental to the properties of the end products. Examples of suitable such monofunctional compounds a) are ammonia, monoamines and monohydric alcohols. Preferred monoamines are, for example, diethyl- and dibutylamine. Examples of preferred monohydric alcohols are monofunctional polyether alcohols, especially hydrophilic ethylene oxide homo- and coaddition products, preferably those with a content of incorporated ethylene oxide units such as to give the novel modified polyurea a content of incorporated ethylene oxide units of up to 30% by weight, in particular up to 10% by weight. Monofunctional polyether alcohols of this kind are expediently incorporated in the course of prepolymer preparation.

Particular preference is given to the incorporation of monohydric alcohols which at the same time still contain polymerisable double bonds. These monoalcohols possess not only molecular weight-regulating properties but also, following their incorporation, the capacity to bond covalently to the vinyl polymer which is to be grafted on, and thus to bring about a marked increase in the grafting yield. Among such monoalcohols with polymerisable double bonds mention may be made, for example, of 2-hydroxyethyl (meth)acrylate and hydroxypropyl (meth) acrylate.

Where monoamines e) are employed as chain regulators, they are expediently employed subsequently to the chain extension using polyamines c). Employed thus, these monoamines e) can optionally be employed in an amount up to that equivalent mathematically to the remaining NCO groups.

Suitable structural components c) are aliphatic and/or alicyclic primary and/or secondary polyamines, examples being: 1,2-ethanediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane, adipic dihydrazide or diethylenetriamine.

Other preferred polyamines c) include polyetherpolyamines which come about formally by replacement of the hydroxyl groups in the above-described polyetherpolyols b) by amino groups. Such polyetherpolyamines can be prepared by reacting the corresponding polyetherpolyols with ammonia and/or primary amines.

Also preferred as structural component c) is hydrazine or hydrazine hydrate.

As structural components d) it is optionally also possible for aminoalcohols, for example ethanolamine, 2-propanolamine, diethanolamine or N-(2-hydroxyethyl) ethylenediamine, to be used.

High molecular mass polyureas can also be obtained by a reaction of prepofymers with water (f) for chain extension.

The abovementioned structural components a) to d) can optionally also include anionic carboxylate and/or sulfonate groups and can be used, at least proportionately, in this modified form. Such structural components and their use for preparing anionic polyureas are described, for example, in Methoden der Organischen Chemie [Methods of Organic Chemistry] (Houben-Weyl), Vol. E 20, Thieme Verlag, Stuttgart 1989, p. 1659 ff.

Since, however, these modified structural components raise the hydrophilicity of the products after drying on has taken place, the concomitant use of such structural components is only desirable when it reduces, as a result for example of synergy effects, the overall amount of hydrophilic centers within the product.

It is of course also possible for auxiliaries and additives which are customary in polyurethane chemistry, for example catalysts, such as tertiary amines, organometallic compounds, including organotin or organotitanium compounds, and also customary emulsifiers, antioxidants or hydrolysis stabilizers, to be added at any desired point in time during the preparation of the polyureas.

Chain extension of the NCO prepolymers with the polyamines c) generally takes place at temperatures between 20 and 70° C., preferably from 30 to 60° C.

The remaining isocyanate groups react immediately or within the course of the subsequent steps with water f) to form urea, or participate to a minor extent in the reaction of salts of the cyanamide, to form cyanourea anions (II) whose content, however, is preferably less than 5 milliequivalents, based on 100 g of modified polyurea.

The reaction time can vary between a few minutes and up to several hours. In the case of relatively long reaction times in particular, a large part of the remaining isocyanate groups are converted by means of water, with chain extension, so that the formation of cyanourea anions (II) is minimized.

The NCO prepolymers are preferably diluted, prior to reaction with c), with water-miscible, isocyanate-unreactive, low-boiling solvents. Also possible is the use of water-insoluble solvents, for example of free-radical-polymerisable monomers which, following the preparation of the polyurea dispersion, can be subjected to free-radical polymerisation.

Examples of suitable diluents for the NCO prepolymers are solvents from the series of the cyclic ethers and open-chain ketones, preferably with boiling points below 100° C., examples being tetrahydrofuran, butanone and acetone; particular preference is given to acetone. The prepolymers are diluted so as to give solutions with concentrations of from 20 to 70% by weight, preferably from 30 to 50% by weight.

The polyamines c) are generally employed in dilute organic solution, preferably dilute aqueous solution.

In this context, the concentration of the amine solution can be varied within wide limits. When using amines dissolved in water, however, it should be noted that the chain extension reaction proceeds in homogeneous phase. If the amines c) are employed in organic solution, the parameters regarding concentration, reaction temperature and reaction time which apply are those already mentioned for aqueous solutions. Acetone is preferred as organic solvent. The abovementioned conditions likewise apply when monoamines e) are used as well.

The reaction with salts of the cyanamide (V) can take place in accordance with different variants. On the one hand it is possible first of all to add the cyanamide in solution, preferably in aqueous solution, and then to add, as the pure substance or as a solution, the base which is required to neutralize the cyanamide. On the other hand, however, it is also possible to add the cyanamide salt in aqueous or organic solution. Acetone is the preferred organic solvent.

The reaction temperature is generally held at between 20 and 80° C., preferably between 30 and 60° C. The amount of cyanamide salt (V) employed is between 50 and 100%, preferably between 70 and 95% of the equivalence amount, based on the overall content of reactive groups (III) and/or (IV) in the polyurea. Following the reaction with cyanamide salt (V), any reactive groups (III) and/or (IV) still present can optionally be crosslinked with amines, as is described in U.S. Pat. No. 4,546,153. The reaction time is generally between a few minutes and several hours. In the case of the preferred oxadiazinetrione structures, the course of the reaction is easy to follow. The reaction is over when the evolution of carbon dioxide is at an end. If working in an aqueous system, the amount of water should be such as to keep the reaction system single-phase; however, this is less critical than in the case of the chain extension reaction; an incipient two-phasedness can possibly be tolerated.

For neutralizing the cyanamide it is possible to employ both inorganic bases, for example ammonia, sodium hydroxide or sodium carbonate, and organic bases, for example tertiary amines, such as triethylamine, trimethylamine, triisopropylamine, tri-n-butylamine, N,N-dimethylaminoethanol, trisisopropanolamine, pyridine or N-methylmorpholine. Preference is given to volatile bases, especially ammonia and triethylamine.

After the end of the reaction with the cyanamide salts (V) the reaction product obtained can be converted to a dispersion by dilution with water and distillative removal of the organic solvents employed.

In principle, all variants known in PUR chemistry are possible for preparing the NCO prepolymers, so that desired hard and soft segment lengths and distributions can be established without compulsion.

The graft monomers A include a) α,β-olefinically unsaturated monocarboxylic acids having 3 to 5 carbon atoms and their esters and/or nitriles and amides, such as acrylic, methacrylic and crotonic acid, acrylamides and methacrylamides, acrylonitrile and methacrylonitrile, esters of acrylic and methacrylic acid, especially those with saturated monovalent aliphatic or cycloaliphatic alcohols of 1 to 20 carbon atoms, such as esters of the said acids with methyl, ethyl, propyl, isopropyl, n-butyl, isobutyl, hexyl, 2-ethylhexyl, octyl and stearyl alcohol, cyclohexanol and methylcyclohexanol, and also with benzyl alcohol, phenol, cresol and furfuryl alcohol, monoesters of α,β-monoolefinically unsaturated monocarboxylic acids having 3 to 4 carbon atoms with divalent saturated aliphatic alcohols having 2 to 4 carbon atoms, such as, for example, 2-hydroxyethyl methacrylate, hydroxypropyl methacrylate, 4-hydroxybutyl methacrylate, 2-hydroxyethyl acrylate, hydroxypropyl acrylate, 4-hydroxybutyl acrylate; and glycidyl esters of acrylic and methacrylic acid, such as glycidyl methacrylate;

(Monomers with two or more double bonds in the molecule can also be employed. By this means it is then possible to obtain highly branched or else crosslinked polymer particles, so-called microgels. Examples of suitable such monomers are ethylene glycol diacrylate or methacrylate), b) α,β-olefinically unsaturated dicarboxylic acids having 3 to 5 carbon atoms, and their derivatives, such as fumaric acid, maleic acid, itaconic acid, mono- and diesters of the abovementioned dicarboxylic acids with 1 to 18 carbon atoms in the alcohol residue, such as dimethyl maleate, diethyl maleate, dibutyl maleate, monohexyl maleate and monocyclohexyl maleate;

c) esters of vinyl alcohol with carboxylic acids or with hydrohalic acids: vinyl ethers, vinyl ketones and vinyl amides, such as vinyl acetate, vinyl propionate, vinyl laurate, vinyl stearate, vinyl benzoate, chlorovinyl acetate, divinyl adipate, vinyl chloride, vinylidene chloride, vinyl ethyl ether, vinyl butyl ether, vinyl isobutyl ether, vinyl ethyl ketone, vinylformamide and N-vinylacetamide;

d) vinyl compounds of aromatics and heterocycles, such as styrene, α-methylstyrene, vinyltoluene, p-chlorostyrene, divinylbenzene, 2-vinylpyrrolidone and 2-vinylpyridine;

e) N-methylol ethers of acrylamide and methacrylamide, of the formula

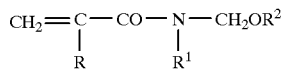

(VIII)

in which

R represents hydrogen or methyl,

R1 represents hydrogen, alkyl, aralkyl or aryl, and

R2 represents alkyl or cycloalkyl, for example methyl, ethyl, n-propyl, isopropyl, n-butyl, isobutyl or cyclohexyl (cf. DE-B-1 035 363), and also the non-etherified N-methylol compounds of acrylamide and methacrylamide;

f) Mannich bases of acrylamide and methacrylamide, of the formula

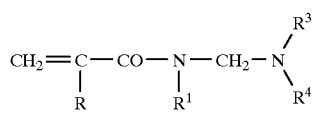

(IX)

in which

R and R$^1$ have the same meaning as in the formula (I), and

R3 and R4 represent alkyl, cycloalkyl or together represent a heterocyclic radical such as the morpholine radical; (Suitable compounds of this type are disclosed in DE-B-1 102 404.)

g) acrylic and methacrylic acid derivatives having a terminal halomethylcarbonyl group, of the formula

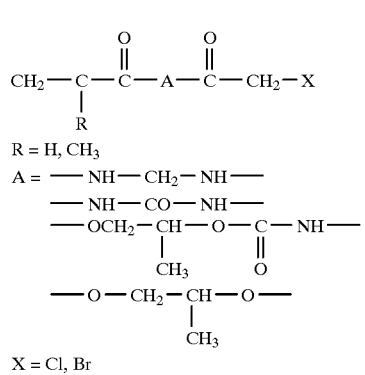

(X)

R = H, CH$_3$
A = —NH—CH$_2$—NH—
    —NH—CO—NH—
    —OCH$_2$—CH—O—C—NH—
         |        ||
         CH$_3$    O
    —O—CH$_2$—CH—O—
              |
              CH$_3$

X = Cl, Br (cf. BE-A-696 010);

h) allyl compounds, such as triallyl cyanurate, triallyl phosphate, allyl alcohol and allylamine;

i) monoolefinically unsaturated aliphatic hydrocarbons having 2 to 6 carbon atoms, such as ethylene, propylene, butylene and isobutylene;

j) conjugated diolefins having 4 to 6 carbon atoms, such as butadiene, isoprene, 2,3-dimethylbutadiene and chlorobutadiene; and also k) norbornene and hydroxymethylnorbornene.

Use is preferably made of: acrylic and methacrylic esters having 1 to 12 carbon atoms in the alcohol residue, acrylic acid, methacrylic acid, and the C$_2$–C$_4$-hydroxyalkyl esters of these acids, styrene, acrylonitrile and methacrylonitrile, vinyl acetate and vinyl propionate in conjunction with one or more of the monomers listed.

Polymerisation generally takes place at temperatures from 10 to 150° C., preferably from 40 to 130° C.

Suitable initiators generally comprise from 0.05 to 5% by weight, based on the monomers, of initiators which decompose into free radicals. Examples of such initiators are organic peroxides, for example lauroyl peroxide, cyclohexanone hydroperoxide, tert-butyl peroctoate, tert-butyl perpivalate, tert-butyl perbenzoate, dichlorobenzoyl peroxide, dibenzoyl peroxide, di-tert-butyl peroxide, tert-butyl hydroperoxide, cumene hydroperoxide, peroxycarbonates, such as di-iso-propyl peroxydicarbonate, dicyclohexyl peroxydicarbonate, diisooctyl peroxydicarbonate, sulfonyl peroxides, such as acetylcyclohexyl-sulfonyl peracetate, sulfonylhydrazides, azo compounds, such as azodiisobutyronitrile and also water-soluble azo compounds as are described, for example, in DE-A 2 841 045.

Inorganic peroxides, such as hydrogen peroxide, potassium peroxodisulphate and ammonium peroxodisulphate, are likewise suitable.

The initiators which decompose into free radicals can be employed alone or else in conjunction with reducing agents or heavy metal compounds. Examples of such compounds are sodium or potassium pyrosulphite, formic acid, ascorbic acid, thiourea, hydrazine derivatives and/or amine derivatives, and Rongalit. The heavy metal compounds may be either in oil-soluble or in water-soluble form. Examples of water-soluble heavy metal compounds are silver nitrate, halides or sulphates of divalent or trivalent iron, cobalt or nickel, and salts of titanium or vanadium in lower valency states. Examples of oil-soluble heavy metal compounds are cobalt naphthenate or the acetylacetone complexes of vanadium, cobalt, titanium, nickel or of iron.

Polymerisation is generally carried out at a pH from 2 to 10. After the end of polymerisation, in the case of a pH below 7 the pH is adjusted to between 7 and 9 with neutralizing agents, for example ammonia and amines.

To regulate the molecular weights of the polymers it is also possible to employ customary regulators, examples being n-dodecyl mercaptan, t-dodecyl mercaptan, diisopropylxanthogen disulphide, thioglycol and thioglycerol. They are generally added in amounts of from 0.1 to 2% by weight, based on the monomer mixture.

Emulsion polymerisation in an aqueous medium can be carried out, in accordance with known polymerisation techniques, alternatively batchwise or continuously or by the feed technique.

Particular preference is given to the continuous and the feed techniques. In the latter technique, water is introduced as initial charge together with some or all of the polyurea dispersion and, if desired, some of the monomer mixture, possibly with additional anionic or nonionic emulsifier, under a nitrogen atmosphere, this initial charge is heated to the polymerisation temperature, and the monomer mixture and also the initiator and, if appropriate, polyurea dispersion and emulsifier are added dropwise over the course of from 0.5 to 10 hours, preferably from 1 to 6 hours.

After a certain time, the polymerisation is reactivated and reaction is completed up to a degree of conversion of from about 99.0% to 99.9% by weight. Residual monomers and, if appropriate, any organic solvents present can be removed by vacuum distillation after the emulsion polymerisation, possibly together with the water present or with a part thereof. Subsequently, it is optionally possible to add further water so as to give process products which are dispersions with a concentration of from 10 to 60% by weight, preferably from 20 to 50% by weight.

The mean particle diameters as measured by means of laser scattered light correlation spectroscopy, depending on the reaction conditions, are between 20 and 1000 nm, preferably between 50 and 500 nm. Dispersions with particle sizes below 50 nm appear transparent, while those with larger particles appear increasingly cloudy.

The dispersions can be blended with dispersions of equal charge, such as, for example, with polyvinyl acetate, polyethylene, polystyrene, polybutadiene, polyvinyl chloride and polyacrylate dispersions.

Finally, it is also possible to incorporate fillers, plasticizers, pigments, hydrofluoric and silicic acid sols, and aluminium dispersions, clay dispersions and asbestos dispersions.

The novel process products constitute stable, storable and transportable aqueous dispersions and can be processed by shaping at any desired later point in time. They generally dry directly to form dimensionally stable polymer coatings. The shaping of the process products can also take place in the presence of conventional crosslinking agents. For this purpose, polyfunctional substances with a crosslinking action are added to the graft polymers in the course of the process and, following evaporation of any solvent present, they bring about chemical crosslinking at room temperature or elevated temperature. Mention may be made of: sulphur, free and partially or completely masked polyisocyanates, carbodiimides, formaldehyde or formaldehyde donor substances, melamine resins, methylol compounds and their ethers, and organic and inorganic peroxides.

As already stated above, it is also possible to obtain dispersions which autocrosslink at elevated temperature, when blocked isocyanate groups have been incorporated into the polyureas, during the preparation of the polyureas, by the concomitant use of blocking agents for isocyanate groups of the type mentioned.

Of particular interest is the use of non-blocked polyisocyanates if, for example, hydroxyl-containing graft polymers are present. According to EP-A 358 979, it is possible following application of this two-component system for polyurethane networks to be produced.

The optionally dissolved or slurried crosslinking agents, fillers, thickeners, pigments and other additives can be added in the course of the process.

The aqueous dispersions obtainable by the novel process are suitable for diverse applications.

Thus it is possible to obtain dipped articles, foams by the latex mechanical foaming process, coagulates by the addition of electrolyte to the aqueous dispersions, which coagulates can be processed on a mixing roll, and tack-free and tacky films or sheets by evaporation of the water. The process products are suitable for coating and/or for covering and for impregnating woven and nonwoven textiles, leather, metals, ceramic, earthenware, concrete, bitumen, hard fibers, straw, glass, porcelain, plastics of a wide variety of types, glass fibers, for antistatic finishing and creaseproofing, as binders for nonwovens, adhesives, adhesion promoters, laminating agents, hydrophobicizing agents, plasticizers, binders, for example for cork flour or wood flour, glass fibers, asbestos, waste plastics or waste rubber, ceramic materials, as auxiliaries in textile printing, as an additive to polymer dispersions, as sizes and for finishing leather.

Preference is given to the use of these dispersions for aqueous coating systems and for coating flexible substrates such as leather.

The percentages in the following examples denote percentages by weight; parts are parts by weight.

EXAMPLES

Preparation of the Polyurea Dispersions

Example 1

In a 100 l vessel with stirrer mechanism and circulation heating, 8.5 kg of a difunctional hexanediol polycarbonate (OH number=56) and 2.7 kg of a bisphenol A-based polypropylene oxide diol (OH number=200) are dewatered under 120 mbar and with stirring at 110 to 120° C. for 60 minutes. The vacuum is then disrupted with nitrogen. After the mixture has cooled to 80° C., 53 g of 2-ethylhexanol and, 10 minutes later, 1.6 kg of isophorone diisocyanate, 0.61 kg of hexamethylene diisocyanate and 1.78 kg of 3,5-bis-(6-isocyanatohexyl)-2,4,6-trioxotetrahydro-1,3,5-oxadiazine (technical-grade product, MW=420) are added. After stirring at 80° C. for 6 hours a constant isocyanate content of 3.05% is reached. The mixture is diluted with 28.5 kg of acetone and cooled to 45 to 50° C. A solution consisting of 0.26 kg of isophoronediamine, 64 g of hydrazine hydrate, 0.18 kg of sodium N-(2-aminoethyl)-2-aminoethane-sulfonate and 1.65 kg of deionized water is run into the existing solution. 15 minutes later, 2.30 kg of a 10% strength aqueous cyanamide solution are run in. 10 minutes later still, 0.57 kg of triethylamine is added. After stirring for one hour at from 40 to 50° C., the stirrer output is set at maximum speed, and dispersion is carried out with 27.5 kg of deionized water. The acetone is subsequently distilled off under vacuum (120 mbar). A fine dispersion is obtained with a solids content of 35±1% and an efflux viscosity of 17 s (DIN cup 4 mm).

Example 2

In a 100 l vessel with stirrer mechanism and circulation heating, 7.2 kg of a difunctional hexanediol polycarbonate (OH number=56) and 2.27 kg of a bisphenol A-based polypropylene oxide diol (OH number=200) are dewatered under 120 mbar and with stirring at 110 to 120° C. for 60 minutes. The vacuum is then disrupted with nitrogen. After the mixture has cooled to 80° C., 1.36 kg of isophorone diisocyanate, 0.54 kg of hexamethylene diisocyanate and 1.36 kg of 3,5-bis-(6-isocyanatohexyl)-2,4,6-trioxotetrahydro-1,3,5-oxadiazine (technical-grade product, MW=420) are added. After stirring at 80° C. for 6 hours a constant isocyanate content of 3.10% is reached. The mixture is subsequently cooled to 70° C., and 0.50 kg of hydroxyethyl methacrylate is added. After 3 hours, the mixture is diluted with 24 kg of acetone and cooled to 45 to 50° C. A solution consisting of 0.125 kg of isophoronediamine, 25 g of hydrazine hydrate, 0.165 kg of sodium N-(2-aminoethyl)-2-aminoethane-sulfonate and 2.7 kg of deionized water is run into the existing solution. 15 minutes later, 1.77 kg of a 10% strength aqueous cyanamide solution are run in. 10 minutes later still, 0.44 kg of triethylamine is added. After stirring for one hour at from 40 to 50° C., the stirrer output is set at maximum speed, and dispersion is carried out with 24 kg of deionized water. The acetone is subsequently distilled off under vacuum (120 mbar). A fine dispersion is obtained with a solids content of 35±1% and an efflux viscosity of 15 s (DIN cup 4 mm).

Example 3

In a 100 l vessel with stirrer mechanism and circulation heating, 8.64 kg of a difunctional hexanediol polycarbonate (OH number=56) and 2.85 kg of a bisphenol A-based polypropylene oxide diol (OH number=200) are dewatered under 120 mbar and with stirring at 110 to 120° C. for 60 minutes. The vacuum is then disrupted with nitrogen. After the mixture has cooled to 80° C., 50 g of 2-ethylhexanol, 1.63 kg of isophorone diisocyanate, 0.62 kg of hexamethylene diisocyanate and 1.78 kg of 3,5-bis(6-isocyanatohexyl)-2,4,6-trioxotetrahydro-1,3,5-oxadiazin (technical-grade product, MW=420) are added. After stirring at 80° C. for 6 hours a constant isocyanate content of 3.10% is reached. The mixture is diluted with 36 kg of acetone and cooled to 45 to 50° C. A solution consisting of 0.365 kg of isophoronediamine and 90 g of hydrazine hydrate, in 2.7 kg of deionized water is run into the existing solution. 15 minutes later, 2.25 kg of a 10% strength aqueous cyanamide solution are run in. 10 minutes later still, 0.54 kg of triethylamine is added. After stirring for one hour at from 40 to 50° C., the stirrer output is set at maximum speed, and dispersion is carried out with 31.7 kg of deionized water. The acetone is subsequently distilled off under vacuum (120 mbar).

A fine dispersion is obtained with a solids content of 30±1% and an efflux viscosity of 20 s (DIN cup 4 mm).
Preparation of the Graft Polymers Examples A to D The mixtures I (cf. Table 1) are initially charged to a 2 l flask with ground-glass joints, which is fitted with paddle stirrer, reflux condenser, gas inlet, gas outlet and devices for metering monomers and initiator solutions. The flask is flushed with nitrogen for 30 minutes and heated, with stirring, to an internal temperature of 80° C. The initiator II is then added very rapidly. Subsequently, the monomer mixtures III are metered in at a uniform rate over the course of 2 hours. This is followed by stirring for 1 hour, and then the batch is reactivated with IV. Stirring is continued for 4 hours, and then partial distillation is carried out under a water-pump vacuum at an internal pressure of from 100 to 400 mbar, and residual monomers are removed. 20 to 30 ml of condensate are collected. The dispersion is subsequently cooled and filtered through a filter cloth with a mesh size of 100 μm. Subsequently, the physicochemical characteristics indicated in Table 1 are determined.

TABLE 1

| Examples | Graft polymers A to D | | | |
| --- | --- | --- | --- | --- |
|  | A | B | C | D |
| I. Initial charge | | | | |
| Polyurea dispersion 3: (concentration: 30,0%) | 333 g | 667 g | 1000 g | 1333 g |
| Deionized water: | 530 g | 300 g | 70 g | — |
| Emulsifier X*: | 10 g | 7.5 g | 5 g | 2.5 g |
| II. Initiator | | | | |
| t-Butyl per-2-ethylhexanoate: | 1.0 g | 0.75 g | 0.5 g | 0.25 g |
| III. Monomer mixture | | | | |
| Methyl methacrylate: | 130 g | 98 g | 65 g | 33 g |
| n-Butyl acrylate: | 261 g | 195 g | 130 g | 65 g |
| IV. Initiator (reactivation) | | | | |
| t-Butyl per-2-ethylhexanoate: | 0.3 g | 0.23 g | 0.15 g | 0.08 g |
| Physicochemical characteristics | | | | |
| Solids content (%): | 40.3 | 39.2 | 39.5 | 33.1 |
| pH: | 7.0 | 7.8 | 7.9 | 7.9 |
| Viscosity at RT (mPa · s): | <50 | <50 | <50 | <50 |
| Mean particle diameter (nm): | 152 | 131 | 121 | 102 |

*Emulsifier X:

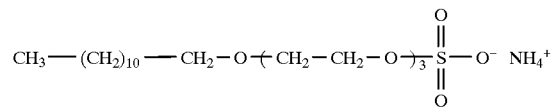

(80% strength in water)

Examples E to L

The mixtures I (cf. Table 2) are initially charged to a 2 l flask with ground-glass joints, which is fitted with paddle stirrer, reflux condenser, gas inlet, gas outlet and devices for metering monomers and initiator solutions. The flask is flushed with nitrogen for 30 minutes and heated, with stirring, to an internal temperature of 80° C. The initiator II is then added very rapidly.

Subsequently, the monomer mixtures III are metered in at a uniform rate over the course of 2 hours. This is followed by stirring for 1 hour, and then the batch is reactivated with IV. Stirring is continued for 4 hours, and then partial distillation is carried out under a water-pump vacuum at an internal pressure of from 100 to 400 mbar, and residual monomers are removed. 20 to 30 ml of condensate are collected. The dispersion is subsequently cooled and filtered through a filter cloth with a mesh size of 100 μm. Subsequently, the physicochemical characteristics indicated in Table 2 are determined.

TABLE 2

Graft polymers E to L

| Examples | E | F | G | H | I | J | K | L |
|---|---|---|---|---|---|---|---|---|
| I. Initial charge | | | | | | | | |
| Polyurea dispersion 1: (concentration: 34.2%) | 585 g | 585 g | 585 g | 585 g | 585 g | 585 g | 585 g | 585 g |
| Deionized water: | 780 g | 780 g | 780 g | 780 g | 780 g | 780 g | 780 g | 780 g |
| II. Initiator | | | | | | | | |
| t-Butyl per-2-ethylhexanoate: | 0.75 g | 0.75 g | 0.75 g | 0.75 g | 0.75 g | 0.75 g | 0.75 g | 0.75 g |
| III. Monomer mixture | | | | | | | | |
| Methyl methacrylate: | 296 g | 251.6 g | 207.2 g | 162.8 g | 118.4 g | 74 g | 29.6 g | — |
| n-Butyl acrylate: | — | 44.4 g | 88.8 g | 133.2 g | 177.6 g | 222 g | 266.4 g | 296 g |
| Emulsifier X*: | 3.75 g | 3.75 g | 3.75 g | 3.75 g | 3.75 g | 3.75 g | 3.75 g | 3.75 g |
| IV. Initiator (reactivation) | | | | | | | | |
| t-Butyl per-2-ethyl-hexanoate | 0.25 g | 0.25 g | 0.25 g | 0.25 g | 0.25 g | 0.25 g | 0.25 g | 0.25 g |
| Physicochemical characteristics | | | | | | | | |
| Solids content (% by weight): | 29.4 | 29.5 | 29.6 | 29.6 | 29.6 | 29.8 | 27.9 | 28.9 |
| pH: | 8.7 | 8.7 | 8.7 | 8.3 | 8.7 | 8.6 | 8.8 | 8.3 |
| Viscosity at RT (mPa.s): | 100 | 100 | 100 | 100 | 100 | 100 | 100 | 100 |
| Mean particle diameter (nm): | 85 | 85 | 84 | 84 | 94 | 79 | 79 | 75 |

*see under Table 1.

Applications-related Section

A) Primers:

A mixture is prepared from 50 parts of a commercially available carbon black formulation (®EUDERM Grundschwarz D-C); 50 parts of a commercial low-binder silicate delustrant (®EUDERM Mattierung SN); 50 parts of a commercially available drying and plumping embossing auxiliary (®EUDERM Nappa Soft S); 300 parts of the primer binder and 500 parts of water. The mixture is brought to an efflux viscosity of from 15 to 17 sec (Ford cup, 4 mm nozzle) with 50 parts of a commercially available polyurethane thickener (®BAYDERM Additiv VL), and is then ready for spraying.

To prepare the test specimens, the formulation containing the respective binder is sprayed onto undressed cattle furniture nappa in an amount per spray application of 20 g of the formulation per square foot. Spraying is carried out once, followed by ironing at 85° C. and 50 bar (through-type ironing machine, rate of advance 6 cm per sec), overspraying is carried out twice, the nappa is then dried at 50° C. for 5 minutes, and then a 1:1 blend of a commercially available emulsion lacquer (®ISODERM LA 85) with water is finally applied in a very thin film. After drying, the test specimens are embossed at 80° C. for 4 sec under a pressure of 300 bar.

The physical leather fastness properties are determined in accordance with DIN 53 351 (crease fastness) and DIN 53 399 (rub fastness), respectively.

The results obtained are as follows:

| Primer binder | Dry creasing | Wet creasing | Cold creasing -10° C. | Cold creasing -25° C. | Wet rubbing |
|---|---|---|---|---|---|
| Example L | 100 000/o | 20 000/o | 10 000/o | 10 000/o | 50/4,x |

B) Finishes

A primer is applied as follows to unfinished cattle furniture nappa:

The leather is first of all preprimed with a formulation comprising 300 parts of a commercially available polyurethane adhesion primer (®BAYDERM Vorgrund APV); 100 parts of isopropanol and 600 parts of water (one cross spray pass).

For the primer, a mixture is prepared from 75 parts of ®EUDERM Grundschwarz D-C; 75 parts of a drying levelling auxiliary (®EUDERM Filler VF-01); 50 parts of a softening antiadhesion agent (® BAYDERM Soft Q); 150 parts of a commercially available soft acrylate dispersion (®EUDERM Dispersion 32 AN); 150 parts of a medium-hard polyurethane dispersion (®BAYDERM Grund 50 UD) and 475 parts of water. This mixture is sprayed twice (one cross pass each time) onto the preprimed leather. Drying is carried out at 70° C. for 5 minutes. The leather is hydraulically ironed (80° C., 200 bar, 6 sec) and then a further spray application of the above mixture (one cross pass) is applied. After drying, ironing is carried out again (80° C., 50 bar, kiss plate). The leather thus primed is employed as a substrate for the preparation of the test specimens. The novel latices suitable as finishing binders are each diluted with water to a solids content of 10% and adjusted with ®BAYDERM Additiv VL to an efflux viscosity of 17 sec. The resulting formulations are sprayed onto the substrate in an amount of 20 g per square foot. The test specimens are dried at 80° C. for 5 minutes and then ironed (through-type ironing machine; 85° C., 50 bar, rate of advance 6 cm per sec).

The physical fastness properties are as follows:

| Finishing binder | Dry creasing | Wet creasing | Wet rubbing |
|---|---|---|---|
| Example F | 100 000/o | 20 000/o | 1000/4,x |
| Example G | 100 000/o | 20 000/o | 800/5,x |

-continued

| Finishing binder | Dry creasing | Wet creasing | Wet rubbing |
|---|---|---|---|
| Example H | 100 000/o | 20 000/o | 1000/3–4,x |
| Example C | 100 000/o | 20 000/o | 1000/4–5,o–x |

Comparison Experiments

VI

The procedure as described in the "Applications-related Section" under "B) Finishes" is followed, with the polyurethane urea dispersion given as Example 3 being used without grafting and without crosslinking agents. The following physical fastness properties are obtained:

| Dry creasing | Wet creasing | Wet rubbing |
|---|---|---|
| 100 000/o | 20 000/o | 280/3–4,x |

What is notable here is the much lower level of the pure polyurethane urea in terms of wet rubbing, as compared with the above graft polymers.

We claim:

1. Process for preparing graft polymers of
A. from 5 to 95 parts by weight of polymerisable olefinically unsaturated monomers as graft monomers on
B. from 95 to 5 parts by weight of polyurea, containing per 100 g of B from 10 to 100 milliequivalents of the group

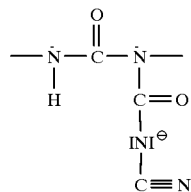
(I)

and optionally up to 50 milliequivalents of the group

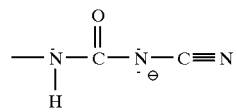
(II)

as graft base,
in accordance with which monomer A is polymerized in aqueous emulsion in the presence of the graft base B and of polymerisation initiators which form free radicals.

2. Graft polymers obtained by the process according to claim 1, having a number-average molecular weight of from $10^3$ to $5 \cdot 10^5$.

3. An aqueous coating composition comprising a graft polymer obtained by the process of claim 1.

* * * * *